United States Patent [19]

Furihata et al.

[11] Patent Number: 5,555,501

[45] Date of Patent: Sep. 10, 1996

[54] ROAD VEHICLE CAB ATTITUDE CONTROLLING APPARATUS

[75] Inventors: Kenichi Furihata; Fumiaki Takei, both of Fujisawa, Japan

[73] Assignee: Isuzu Motors, Ltd., Tokyo, Japan

[21] Appl. No.: 414,343

[22] Filed: Mar. 31, 1995

[51] Int. Cl.$^6$ .................. B60G 11/06; B62D 33/063; B62D 33/10

[52] U.S. Cl. .............. 364/424.05; 180/89.12; 180/89.13; 296/35.1; 296/190

[58] Field of Search ............... 364/424.05; 280/840, 280/6.12, 127; 267/136, 140.11, 140.12, 140.13, 140.15, 140.2, 140.7, 40; 180/89.11, 89.12, 89.13, 311; 296/35.1, 190

[56] References Cited

U.S. PATENT DOCUMENTS

| | | | |
|---|---|---|---|
| 4,141,429 | 2/1979 | Hale | 180/89.14 |
| 4,330,149 | 5/1982 | Salmon | 296/190 |
| 4,451,079 | 5/1984 | Takahashi | 296/190 |
| 4,650,148 | 3/1987 | Sakamoto | 248/561 |
| 4,765,647 | 8/1988 | Kondo et al. | 280/701 |
| 4,998,592 | 3/1991 | Londt et al. | 180/89.12 |
| 5,074,535 | 12/1991 | Colford | 267/140.5 |
| 5,139,104 | 8/1992 | Moscicki | 180/89.13 |
| 5,234,203 | 8/1993 | Smith | 267/131 |
| 5,416,701 | 5/1995 | Kawabata | 364/424.05 |

*Primary Examiner*—Kevin J. Teska
*Assistant Examiner*—Tan Nguyen
*Attorney, Agent, or Firm*—John E. Toupal; Harold G. Jarcho

[57] ABSTRACT

A vehicle cab attitude control system, in which a pair of hydraulic actuators control longitudinal movements between a vehicle frame and portions of the cab located on opposite sides of the cab's center of gravity and spaced vertically therefrom. The hydraulic actuators are controlled dependent on detected changes in longitudinal positions of the cab portions to suppress changes in longitudinal cab attitude. The suppression compensates for existing longitudinal inputs, thus improving riding comfort.

20 Claims, 10 Drawing Sheets

FIG. 5

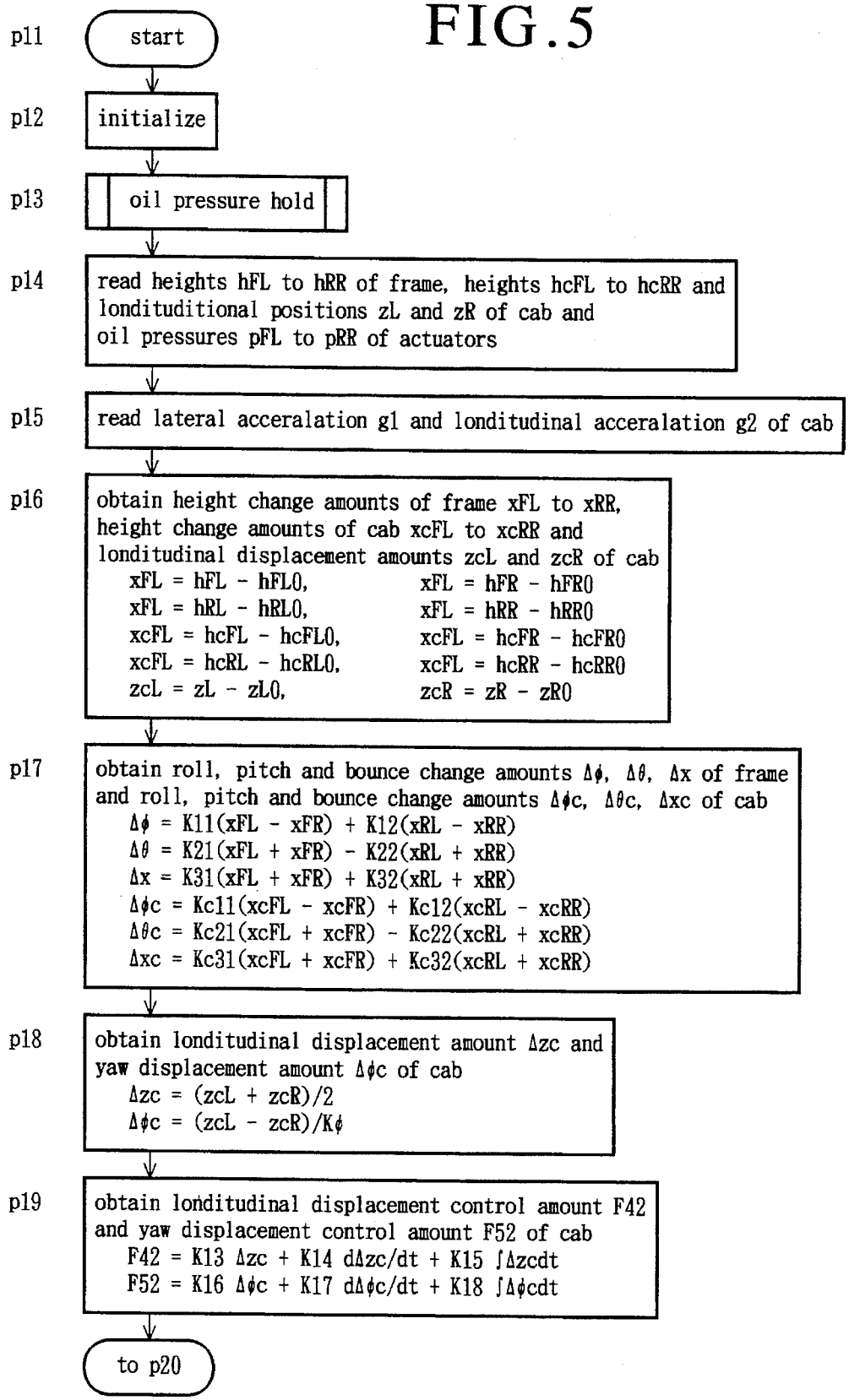

- p11: start
- p12: initialize
- p13: oil pressure hold
- p14: read heights hFL to hRR of frame, heights hcFL to hcRR and londituditional positions zL and zR of cab and oil pressures pFL to pRR of actuators
- p15: read lateral acceralation g1 and londitudinal acceralation g2 of cab
- p16: obtain height change amounts of frame xFL to xRR, height change amounts of cab xcFL to xcRR and londitudinal displacement amounts zcL and zcR of cab
  - xFL = hFL − hFL0,    xFL = hFR − hFR0
  - xFL = hRL − hRL0,    xFL = hRR − hRR0
  - xcFL = hcFL − hcFL0,  xcFL = hcFR − hcFR0
  - xcFL = hcRL − hcRL0,  xcFL = hcRR − hcRR0
  - zcL = zL − zL0,      zcR = zR − zR0
- p17: obtain roll, pitch and bounce change amounts $\Delta\phi$, $\Delta\theta$, $\Delta x$ of frame and roll, pitch and bounce change amounts $\Delta\phi c$, $\Delta\theta c$, $\Delta xc$ of cab
  - $\Delta\phi = K11(xFL - xFR) + K12(xRL - xRR)$
  - $\Delta\theta = K21(xFL + xFR) - K22(xRL + xRR)$
  - $\Delta x = K31(xFL + xFR) + K32(xRL + xRR)$
  - $\Delta\phi c = Kc11(xcFL - xcFR) + Kc12(xcRL - xcRR)$
  - $\Delta\theta c = Kc21(xcFL + xcFR) - Kc22(xcRL + xcRR)$
  - $\Delta xc = Kc31(xcFL + xcFR) + Kc32(xcRL + xcRR)$
- p18: obtain londitudinal displacement amount $\Delta zc$ and yaw displacement amount $\Delta\phi c$ of cab
  - $\Delta zc = (zcL + zcR)/2$
  - $\Delta\phi c = (zcL - zcR)/K\phi$
- p19: obtain londitudinal displacement control amount F42 and yaw displacement control amount F52 of cab
  - $F42 = K13\,\Delta zc + K14\,d\Delta zc/dt + K15\int\Delta zc\,dt$
  - $F52 = K16\,\Delta\phi c + K17\,d\Delta\phi c/dt + K18\int\Delta\phi c\,dt$
- to p20

FIG.8

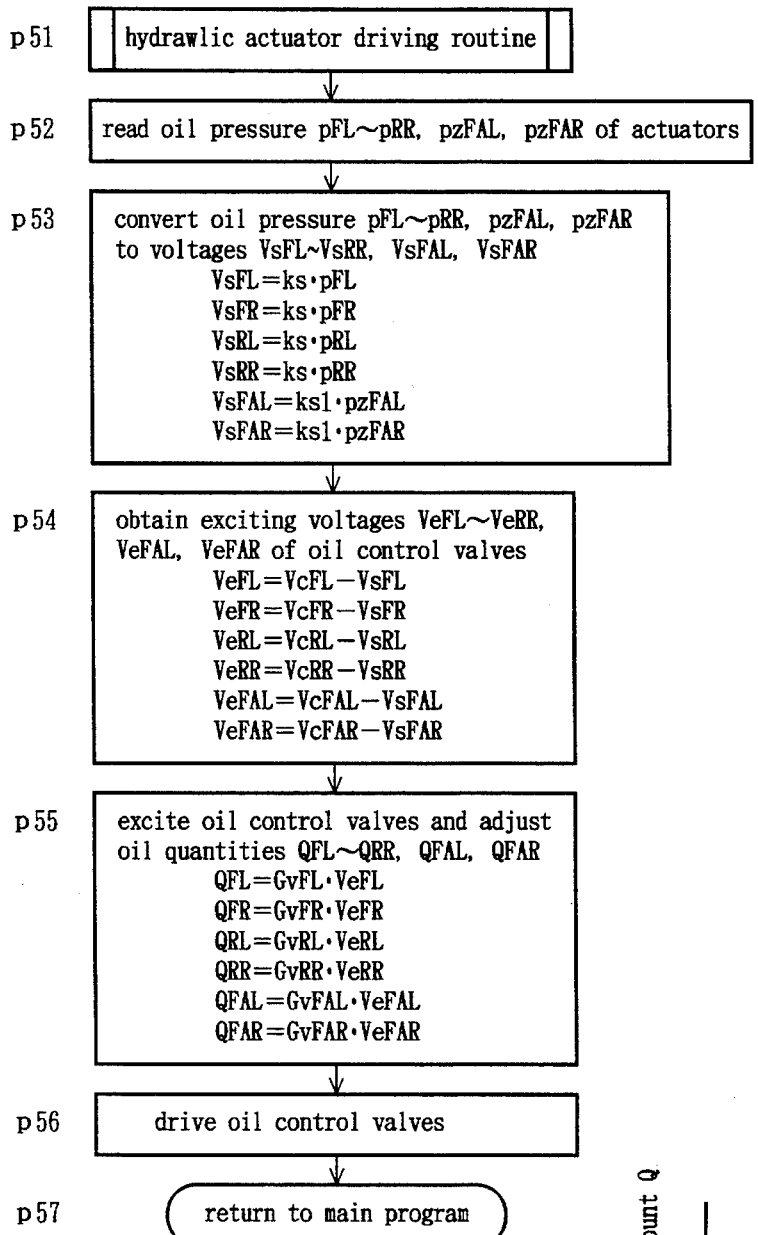

p51 — hydraulic actuator driving routine p52 — read oil pressure pFL~pRR, pzFAL, pzFAR of actuators p53 — convert oil pressure pFL~pRR, pzFAL, pzFAR to voltages VsFL~VsRR, VsFAL, VsFAR
$$VsFL = ks \cdot pFL$$
$$VsFR = ks \cdot pFR$$
$$VsRL = ks \cdot pRL$$
$$VsRR = ks \cdot pRR$$
$$VsFAL = ks1 \cdot pzFAL$$
$$VsFAR = ks1 \cdot pzFAR$$

p54 — obtain exciting voltages VeFL~VeRR, VeFAL, VeFAR of oil control valves
$$VeFL = VcFL - VsFL$$
$$VeFR = VcFR - VsFR$$
$$VeRL = VcRL - VsRL$$
$$VeRR = VcRR - VsRR$$
$$VeFAL = VcFAL - VsFAL$$
$$VeFAR = VcFAR - VsFAR$$

p55 — excite oil control valves and adjust oil quantities QFL~QRR, QFAL, QFAR
$$QFL = GvFL \cdot VeFL$$
$$QFR = GvFR \cdot VeFR$$
$$QRL = GvRL \cdot VeRL$$
$$QRR = GvRR \cdot VeRR$$
$$QFAL = GvFAL \cdot VeFAL$$
$$QFAR = GvFAR \cdot VeFAR$$

p56 — drive oil control valves p57 — return to main program

FIG.9

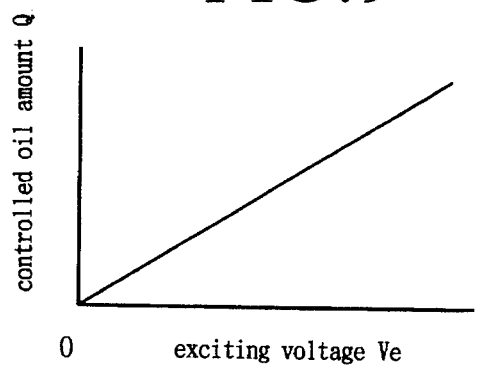

controlled oil amount Q vs. exciting voltage Ve

FIG. 10

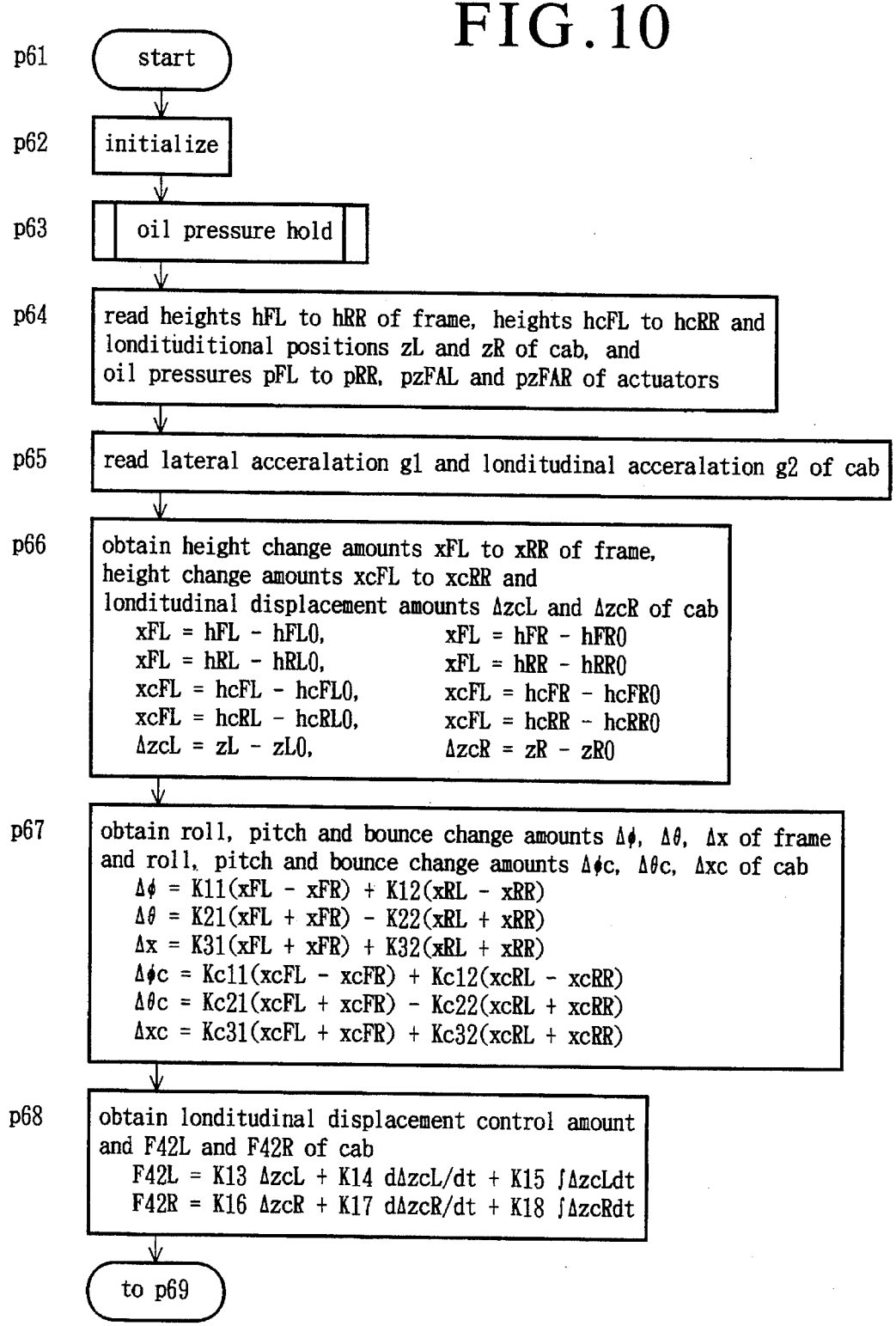

p61 start p62 initialize p63 oil pressure hold p64 read heights hFL to hRR of frame, heights hcFL to hcRR and londituditional positions zL and zR of cab, and oil pressures pFL to pRR, pzFAL and pzFAR of actuators p65 read lateral acceralation g1 and londitudinal acceralation g2 of cab p66 obtain height change amounts xFL to xRR of frame, height change amounts xcFL to xcRR and londitudinal displacement amounts $\Delta$zcL and $\Delta$zcR of cab
  xFL = hFL − hFL0,    xFL = hFR − hFR0
  xFL = hRL − hRL0,    xFL = hRR − hRR0
  xcFL = hcFL − hcFL0,  xcFL = hcFR − hcFR0
  xcFL = hcRL − hcRL0,  xcFL = hcRR − hcRR0
  $\Delta$zcL = zL − zL0,    $\Delta$zcR = zR − zR0 p67 obtain roll, pitch and bounce change amounts $\Delta\phi$, $\Delta\theta$, $\Delta$x of frame and roll, pitch and bounce change amounts $\Delta\phi$c, $\Delta\theta$c, $\Delta$xc of cab
  $\Delta\phi$ = K11(xFL − xFR) + K12(xRL − xRR)
  $\Delta\theta$ = K21(xFL + xFR) − K22(xRL + xRR)
  $\Delta$x = K31(xFL + xFR) + K32(xRL + xRR)
  $\Delta\phi$c = Kc11(xcFL − xcFR) + Kc12(xcRL − xcRR)
  $\Delta\theta$c = Kc21(xcFL + xcFR) − Kc22(xcRL + xcRR)
  $\Delta$xc = Kc31(xcFL + xcFR) + Kc32(xcRL + xcRR)

p68 obtain londitudinal displacement control amount and F42L and F42R of cab
  F42L = K13 $\Delta$zcL + K14 d$\Delta$zcL/dt + K15 $\int$$\Delta$zcLdt
  F42R = K16 $\Delta$zcR + K17 d$\Delta$zcR/dt + K18 $\int$$\Delta$zcRdt to p69

FIG. 11

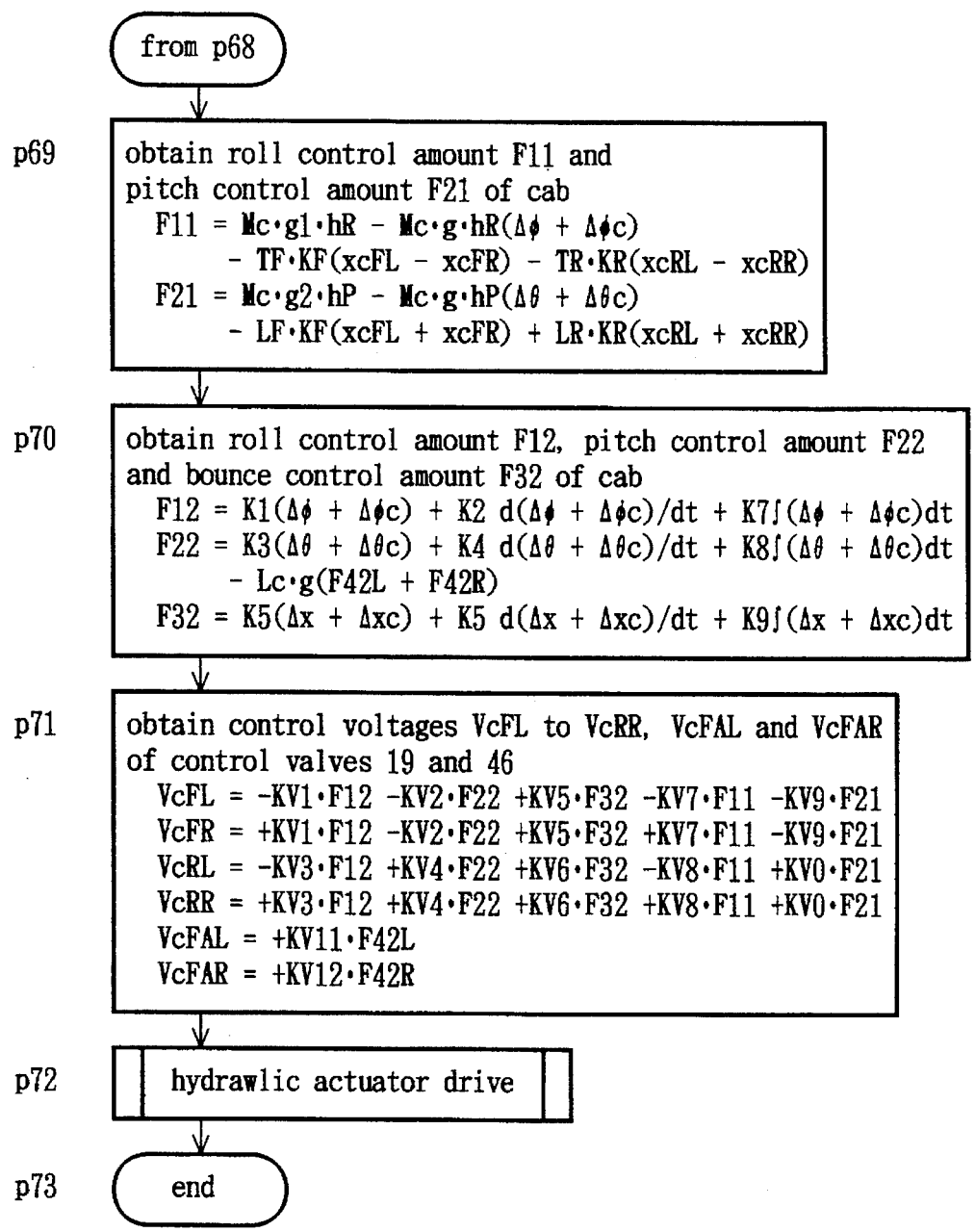

p69: obtain roll control amount F11 and pitch control amount F21 of cab
$$F11 = Mc \cdot g1 \cdot hR - Mc \cdot g \cdot hR(\Delta\phi + \Delta\phi c)$$
$$\quad - TF \cdot KF(xcFL - xcFR) - TR \cdot KR(xcRL - xcRR)$$
$$F21 = Mc \cdot g2 \cdot hP - Mc \cdot g \cdot hP(\Delta\theta + \Delta\theta c)$$
$$\quad - LF \cdot KF(xcFL + xcFR) + LR \cdot KR(xcRL + xcRR)$$

p70: obtain roll control amount F12, pitch control amount F22 and bounce control amount F32 of cab
$$F12 = K1(\Delta\phi + \Delta\phi c) + K2\, d(\Delta\phi + \Delta\phi c)/dt + K7\!\int(\Delta\phi + \Delta\phi c)dt$$
$$F22 = K3(\Delta\theta + \Delta\theta c) + K4\, d(\Delta\theta + \Delta\theta c)/dt + K8\!\int(\Delta\theta + \Delta\theta c)dt$$
$$\quad - Lc \cdot g(F42L + F42R)$$
$$F32 = K5(\Delta x + \Delta xc) + K5\, d(\Delta x + \Delta xc)/dt + K9\!\int(\Delta x + \Delta xc)dt$$

p71: obtain control voltages VcFL to VcRR, VcFAL and VcFAR of control valves 19 and 46
$$VcFL = -KV1 \cdot F12 - KV2 \cdot F22 + KV5 \cdot F32 - KV7 \cdot F11 - KV9 \cdot F21$$
$$VcFR = +KV1 \cdot F12 - KV2 \cdot F22 + KV5 \cdot F32 + KV7 \cdot F11 - KV9 \cdot F21$$
$$VcRL = -KV3 \cdot F12 + KV4 \cdot F22 + KV6 \cdot F32 - KV8 \cdot F11 + KV0 \cdot F21$$
$$VcRR = +KV3 \cdot F12 + KV4 \cdot F22 + KV6 \cdot F32 + KV8 \cdot F11 + KV0 \cdot F21$$
$$VcFAL = +KV11 \cdot F42L$$
$$VcFAR = +KV12 \cdot F42R$$

p72: hydraulic actuator drive p73: end

ROAD VEHICLE CAB ATTITUDE CONTROLLING APPARATUS

BACKGROUND OF THE INVENTION

The present invention relates generally to an apparatus for controlling the attitude of a road vehicle cab, and, more particularly, to such apparatus for suppressing externally produced longitudinal changes in attitude of the vehicle cab to thereby enhance riding comfort.

Disclosed in Japanese Patent Application No. 4-285002 (1952) is a vehicle cab attitude control system in which instructions are provided by an occupant, an optimum control parameter is computed according to existing road surface input status cab attitude is controlled using a new control parameter to thereby improve riding comfort. However, the disclosed system merely suppresses cab movements such as pitch, roll and bounce caused by vertical input from a road surface, and does not suppress cab movement caused by externally generated longitudinal inputs. That deficiency is particularly troublesome for a tractor and trailer combination in which longitudinal input from the trailer results in disturbing acceleration and deceleration of the tractor cab.

The object of this invention, therefore, is to provide an improved vehicle cab control system which suppresses externally caused longitudinal movement and thereby enhance riding comfort.

SUMMARY OF THE INVENTION

The present invention is a vehicle cab attitude control system, in which a pair of hydraulic actuators control longitudinal movements between a vehicle frame and portions of the cab located on opposite sides of the cab's center of gravity and spaced vertically therefrom. The hydraulic actuators are controlled dependent on detected changes in longitudinal positions of the cab portions to suppress changes in longitudinal cab attitude. The suppression compensates for existing longitudinal inputs, thus improving riding comfort.

According to certain features of the present invention, sensors detect with respect to the vehicle frame, displacements of the cab's center of gravity resulting from longitudinal, yaw and pitch movements and a control system response to the sensors by producing for the actuators control signals that suppress those movements.

According to another feature of the invention, the sensors detect movement of the pistons in the hydraulic actuators. This feature detects longitudinal cab movements in a highly efficient manner.

DESCRIPTION OF THE DRAWINGS

These and other objects and features of the invention will become more apparent upon a perusal of the following description taken in conjunction with the accompanying drawings wherein:

FIG. 5 is a flow chart of the control program;

FIG. 8 is a flow chart of the control program;

FIG. 9 is a diagram representative of a relationship between exciting voltage and control valve oil supply;

FIG. 10 is a flow chart representative of a cab attitude control program according to a modified embodiment of the present invention; and FIG. 11 is a flow chart of the control program.

DESCRIPTION OF THE PREFERRED EMBODIMENTS

Figure 1:
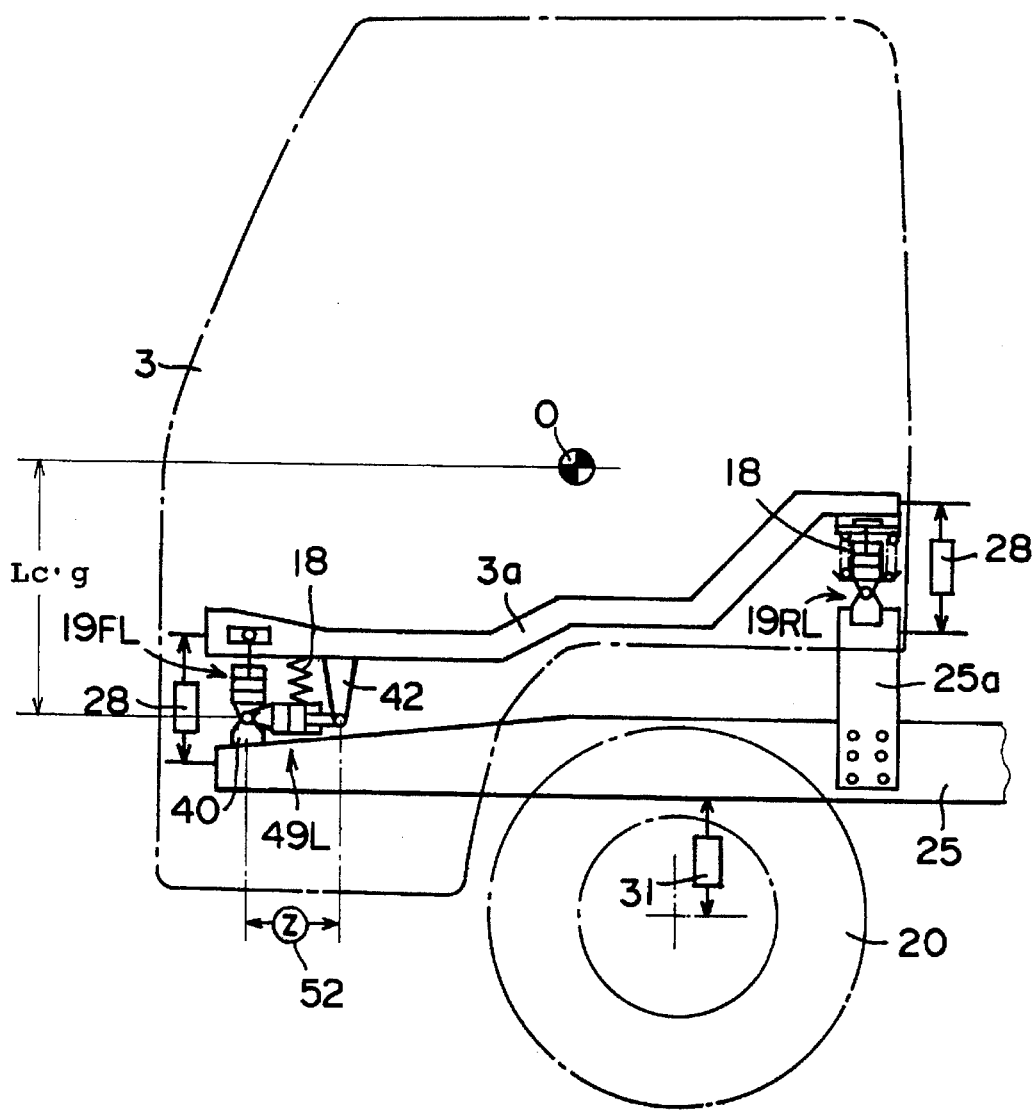
FIG. 1 is a side view of a hydraulic suspension system for a vehicle cab according to the present invention.
Figure 2:
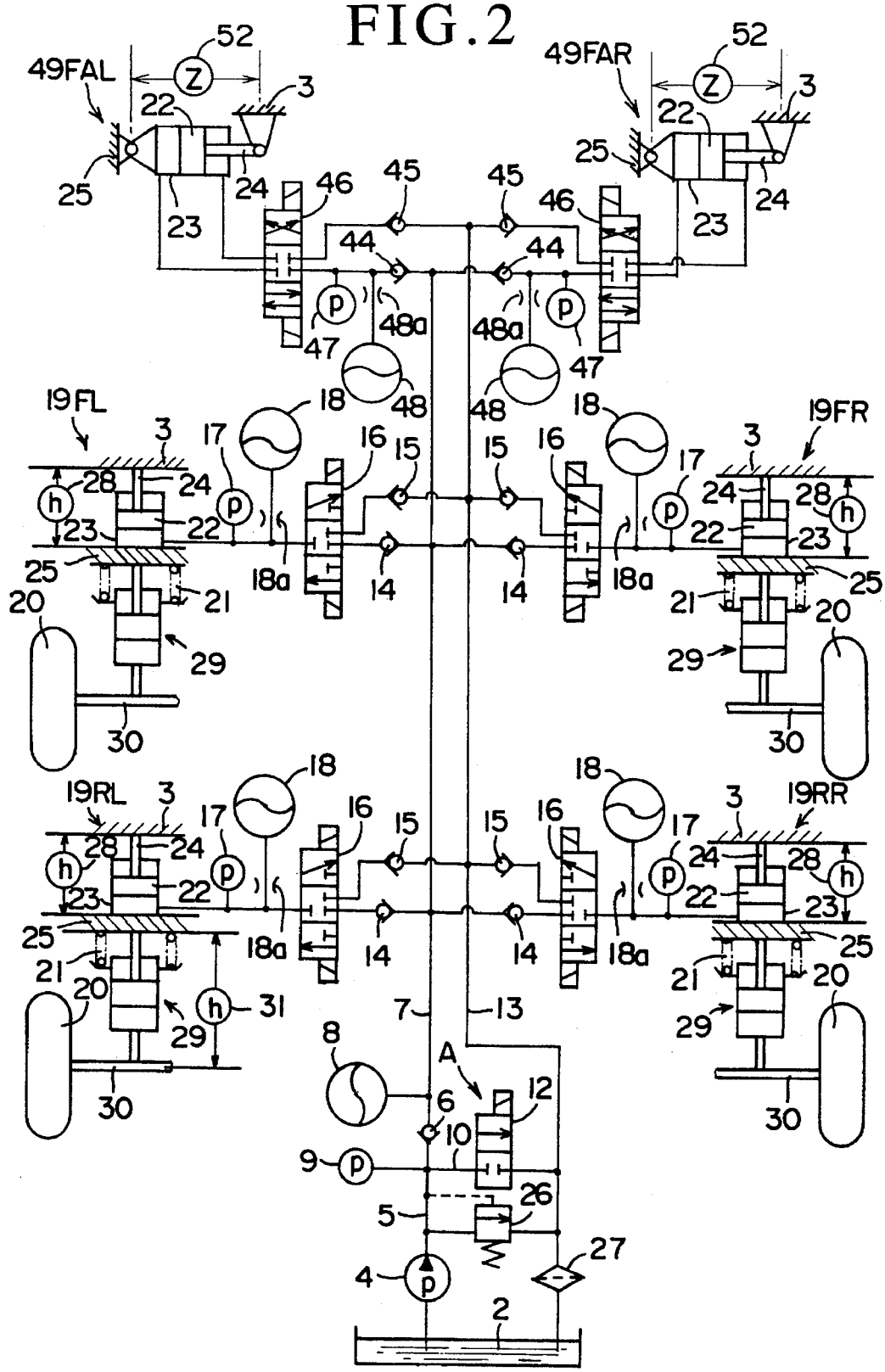
FIG. 2 shows a hydraulic circuit of the hydraulic suspension system shown in FIG. 1.

Illustrated in FIG. 1 is a hydraulic vehicle cab suspension system and FIG. 2 depicts hydraulic circuit for the system. A vehicle frame 25 is suspended on wheels 20 by known spring type suspension mechanisms each having a hydraulic shock-absorber or buffer 29 and a spring 21. Each hydraulic buffer 29 includes a cylinder and piston assembly having the cylinder 23 connected to an axle 30 or a suspension member, and a rod projecting upwardly from the piston 22 connected to the vehicle frame 25. Interposed between the cylinder 23 and the vehicle frame 25 is a spring 21.

As shown in FIGS. 1 and 2, front left, front right, rear left, and rear right corners of a bottom cab frame 3a are each supported on the vehicle frame 25 by, respectively, hydraulic suspension mechanisms 19FL, 19FR, 19RL and 19RR and an accumulator 18. In each hydraulic suspension mechanism 19FL=19RR, the piston 22 is provided with an orifice or throttle passage (not shown) which communicates between lower and upper end chamber 3 of the cylinder 23. The lower end chamber of the cylinder 23 is supplied pressured oil and the upper end chamber discharges into an oil tank 2.

In each of the front hydraulic suspension mechanisms 19FL and 19FR, a rod 24 projecting from the piston 22 is connected to a support plate 53 (FIG. 1) of the bottom frame 3a and the cylinder 23 is connected to an arm 52 on the vehicle frame 25. An inner end of each arm 52 is connected to a support plate 25a on the vehicle frame 25 by a pivot pin 51 and an outer end is connected by a pin 54 to a leg 53a projecting downwardly from the support shaft 53 of the cab 3. In each rear hydraulic suspension mechanism 19RL, 19RR, the rod 24 is connected to a lift bed or seat 55 and the cylinder 23 is connected to a mount 56 of the vehicle frame 25.

Figure 4:
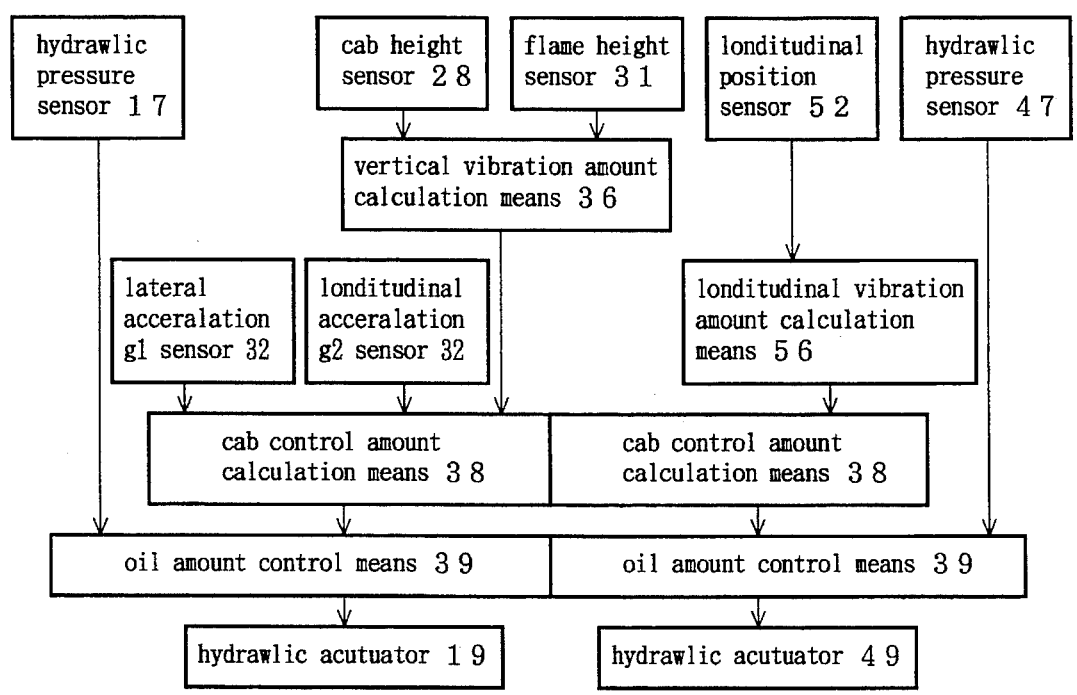
FIG. 4 is a block diagram representative of a cab attitude control program for the system shown in FIGS. 1 and 2.
Figure 6:
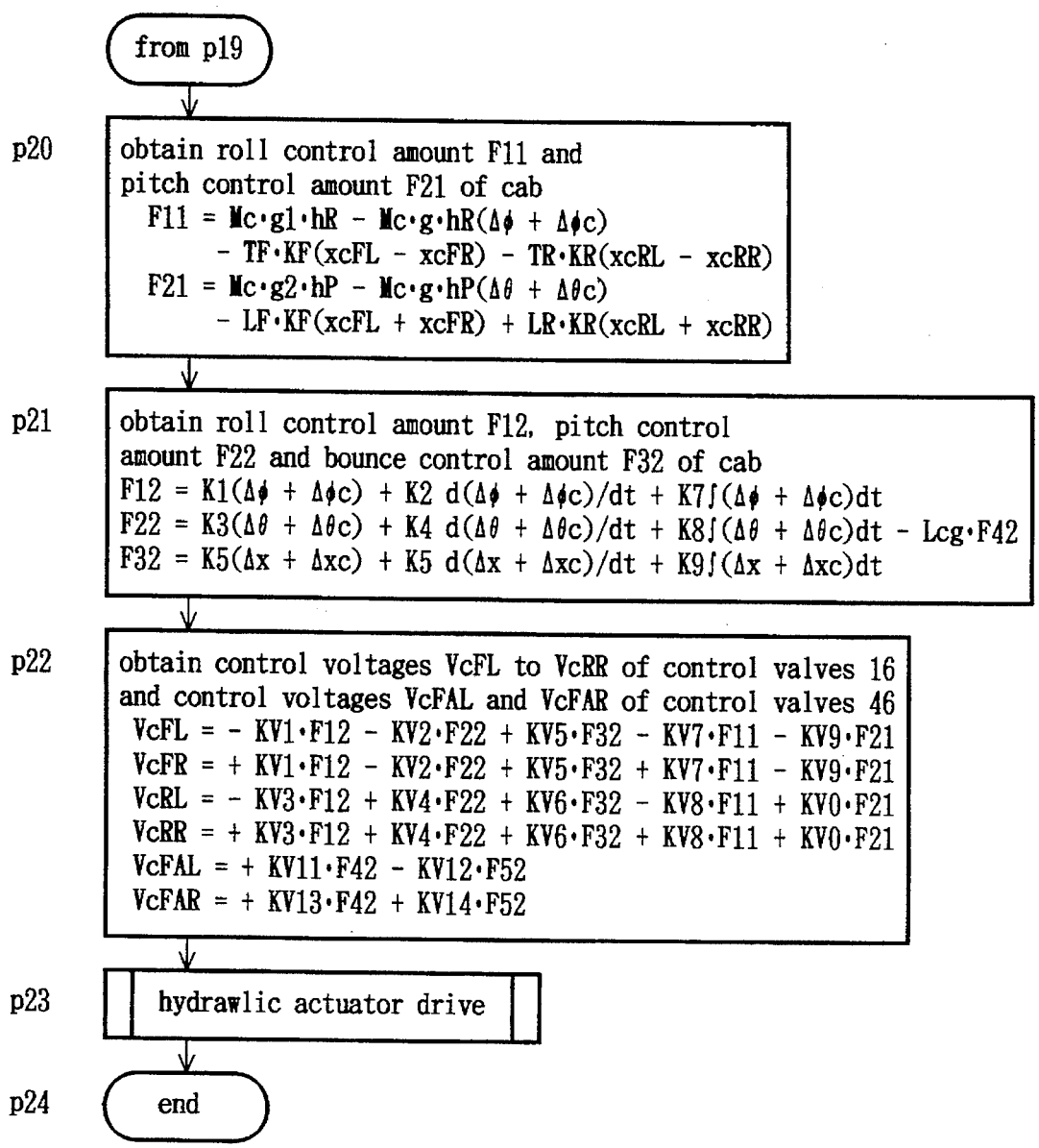
FIG. 6 is a flow chart of the control program.

Sensors 28 (FIG. 1) detect with respect to the vehicle frame 25 changes in vertical displacements of each corner of the cab 3. In addition, sensors 31 (FIG. 2) detect with respect to the axles 30 changes in vertical displacement of the vehicle frame 25. The sensors 31 are disposed on the spring type suspension mechanisms 29 supporting the vehicle frame 25. As shown in FIG. 4, a lateral acceleration sensor 32 and a longitudinal acceleration sensor 33 and a vertical acceleration sensor 34 are disposed on the cab 3 near its center of gravity. The sensors 32–34 provide information for controlling the attitude of the cab 3 when the vehicle turns and moves in acceleration and deceleration modes.

For the purpose of suppressing longitudinal and lateral movements of the cab 3, first and second cab longitudinal hydraulic actuators 49L and 49R are connected by pins between, respectively, a pair of left and right support plates 40 of the vehicle frame 25 and a pair of support plates 42 attached to the bottom frame 3a, as shown in FIGS. 1 and 2. The plates 42 are attached to portions of the cab 3 spaced transversely on opposite sides of the cab's center of gravity and uniformly spaced vertically therefrom by a given distance Lcg (FIG. 1). Orientation of the cab actuators 49 is such as to produce and control longitudinal movement of the cab 3 with respect to the frame 25. Those movements are detected by sensors 52 which monitor movements of the pistons 22 of the cab actuators 49.

As shown in FIG. 2, a hydraulic pressure source A provides actuating oil pressure for the cab suspension mechanisms 19FL–19RR. The system A includes a hydraulic pump 4 that is driven by the vehicle's engine (not shown) to draw oil from an oil tank 2 and supply the oil through a check valve 6 and a pipe 5 to an accumulator 8 communicating with a pipe 7. An oil pressure holding system A is provided to keep oil pressure to the pipe 7 at a predetermined value pt. When a detected oil pressure pm of a hydraulic sensor 9 exceeds the predetermined value pt, a switching valve 12 returns part of the oil in the pipe 5 to the oil tank 2 through a pipe 10, a pipe 13, and a filter 27. Further, when an oil pressure at a discharge port of the hydraulic pump 4 abnormally increases, part of the oil in the pipe 5 is returned to the oil tank 2 through a well-known relief valve 26, the pipe 13 and the filter 27.

At each suspension mechanism 19FL-19RR, pressured oil in the pipe 7 is supplied to an accumulator 18 through an electromagnetic proportional pressure of a neutral position closed type and an orifice or throttle 18a. Oil also is supplied to a lower end chamber of the cylinder 32 of each hydraulic suspension mechanism 19FL-19RR and oil pressure therein is detected by a hydraulic sensor 17. When a control valve 16 is switched, oil in the lower end chamber of the associated cylinder 23 is returned to the oil tank 2 through the control valve 16, a check valve 15 and the pipe 13.

In addition, pressured oil in the pipe 7 is supplied to a pair of pneumatic springs 48 through check valves 44 and throttles 48a. Oil is further supplied by control valves 46 to either the front or rear end chambers of the cylinders 23 each of hydraulic cab actuator 49. Hydraulic sensors 47 detect the pressure of oil supplied to the cylinders 23. Oil in the opposite front or rear end chambers of the cylinder 23 is returned to the oil tank 2 through the oil control valves 46, check valves 45, the pipe 13 and the filter 27. Each of the control valves 16 and 46 feedback-controls oil pressure of, respectively, an associated hydraulic suspension mechanism 19FL-19RR or a cab actuator 49L, 49R corresponding to a control signal voltage from an electronic control device comprised of a microcomputer.

The attitude control of the cab with respect to the vertical road surface input will be described hereinafter. Let hFL to hRR be the relative vehicle height of points of the vehicle frame 25, that is, the wheel support portions, with respect to the road surface, and let hcFL to hcRR be the relative vehicle height of four (front, rear, left and right) points of the cab 3 with respect to the vehicle frame 25. Then, vehicle height change amounts xFL to xRR at the points of the vehicle frame 25 and the vehicle height change amount xcFL to xcRR at the points of the cab 3 are expressed by the following formula (1):

$$xFL = hFL - hFL0, \quad xFR = hFR - hFR0$$
$$xRL = hRL - hRL0, \quad xRR = hRR - hRR0$$
$$xcFL = hcFL - hcFL0, \quad xcFR = hcFR - hcFR0$$
$$xcRL = hcRL - hcRL0, \quad xcRR = hcRR - hcRR0 \quad (1)$$

wherein, hFL0 to hRR0: Standard vehicle height of wheel support portions of a vehicle frame hcFL0 to hcRR0: Standard vehicle height at points of a cab The relative roll displacement amount $\Delta\phi$, the pitch displacement amount $\Delta\theta$ and the bounce displacement amount $\Delta x$ of the vehicle frame 25 with respect to the road surface, and the relative roll displacement amount $\Delta\phi c$, the pitch displacement amount $\Delta\theta c$ and the bounce displacement amount $\Delta xc$ of the cab 3 with respect the vehicle frame 25 are respectively expressed by the following formula (2):

$$\Delta\phi = K11(xFL-xFR) + K12(xRL-xRR)$$
$$\Delta\theta = K21(xFL+xFR) - K22(xRL+xRR)$$
$$\Delta x = K31(xFL+xFR) + K32(xRL+xRR)$$
$$\Delta\phi c = Kc11(xcFL-xcFR) + Kc12(xcRL-xcRR)$$
$$\Delta\theta c = Kc21(xcFL+xcFR) - Kc22(xcRL+xcRR)$$
$$\Delta xc = Kc31(xcFL+xcFR) + Kc32(xcRL+xcRR) \quad (2)$$

wherein,

K11, K21, K31: Constant determined by vehicle data
K12, K22, K32: Constant determined by vehicle data
Kc11, Kc21, Kc31: Constant determined by vehicle data
Kc12, Kc22, Kc32: Constant determined by vehicle data Let $\phi$ be the roll displacement amount given to the vehicle frame 25 by the road surface, $\theta$ be the pitch displacement amount given to the vehicle frame 25 by the road surface and x be the bounce displacement amount given to the vehicle frame 25 by the road surface, then the roll displacement amount $\phi c$, the pitch displacement amount $\theta c$ and the bounce displacement amount xc of the cab 3 are expressed by the following formula (3):

$$\phi c = \phi + \Delta\phi + \Delta\phi c$$
$$\theta c = \theta + \Delta\theta + \Delta\theta c$$
$$xc = x + \Delta x + \Delta xc \quad (3)$$

Vibrations in modes of roll, pitch and bounce of the cab caused by the change in road surface when the vehicles runs straight at constant speed can be expressed by the following kinetic equation (4):

$$IX(d^2\phi c/dt^2) = Mc*g*hR*\phi c - F12$$
$$IY(d^2\phi c/dt^2) = Mc*g*hP*\theta c - F22$$
$$Mc(d^2xc/dt^2) = -F32 \quad (4)$$

wherein,

IX: Inertia moment of the cab with respect to the roll
IY: Inertia moment of the cab with respect to the pitch
Mc: Mass of cab
hR: Difference in level between the roll center RO (FIG. 3) of the cab and the center of gravity O of the cab
hP: Difference in level between the pitch center of the cab and the center of gravity of the cab In the Equation (4), the first term of the right side is the moment for causing the cab 3 to roll (pitch), that is, the product of Mc*g and hR*sin $\phi c$ (Mc*g and hP*sin $\theta c$) which exerts on the center of gravity O of he cab 3 due to the acceleration (g) of the gravity when the cab 3 is inclined.

The roll control amount F12, the pitch control amount F22 and the bounce control amount F32 to be applied to the cab 3 by the hydraulic actuators 19 are determined as in the following equation (5), in order to keep the cab 3 flat (parallel to the road surface) in consideration of transient characteristics of the vibration of the cab 3.

$$F12 = K1(\Delta\phi + \Delta\phi c) + K2\ d(\Delta\phi + \Delta\phi c)/dt + K7\int(\Delta\phi + \Delta\phi c)dt$$

$$F22 = K3(\Delta\theta + \Delta\theta c) + K4\ d(\Delta\theta + \Delta\theta c)/dt + K8\int(\Delta\theta + \Delta\theta c)dt$$

$$F32 = K5(\Delta x + \Delta xc) + K6\ d(\Delta x + \Delta xc)/dt + K9\int(\Delta x + \Delta xc)dt \quad (5)$$

wherein,
K1 to K9: constant

Then, the Equation (5) is expressed by the following Equation (5a):

$$F12 = K1[\phi] + K2\ d[\phi]/dt + K7\int[\phi]dt$$

$$F22 = K3[\theta] + K4\ d[\theta]/dt + K8\int[\theta]\ dt$$

$$F32 = K5[x] + K6\ d[x]/dt + K9\int[x]\ dt \quad (5a)$$

wherein,
$[\phi] = \Delta\phi + \Delta\phi c$
$[\theta] = \Delta\theta + \Delta\theta c$
$[x] = \Delta x + \Delta xc$ The aforementioned vibration control amounts F12, F22 and F32 correspond to the changes in attitude (roll, pitch and bounce) of the cab 3 caused by the change in road surface. If the inertia control amount corresponding to the change in attitude of the cab 3 caused by the centrifugal force when the vehicle turns and the inertia force when the vehicle runs in the mode of acceleration and deceleration is added, the control accuracy and the responsibility can be further improved.

Figure 3:
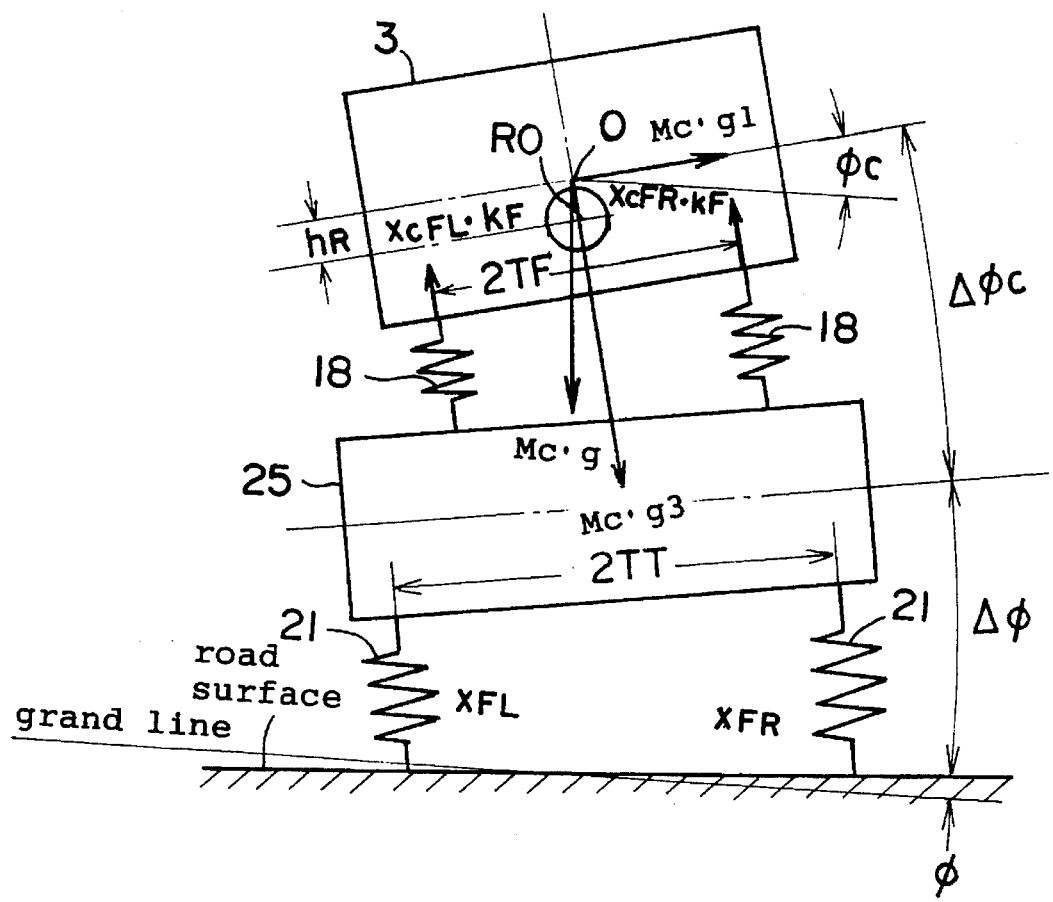
FIG. 3 is a rear view diagram depicting forces acting on the cab.

The vibrations in the modes of the roll of the cab 3 when the vehicle turns on the flat road and the pitch of the cab 3 when the vehicle runs in the mode of acceleration and deceleration can be expressed by the following kinetic equation (6):

$$IX(d^2\theta c/dt^2) = Mc*g1*hR - Mc*g*hR(\Delta\phi + \Delta\phi c) - TF*KF(xcFL - XcFR) - TR*KR(xcRL - xcRR) - F11$$

$$IY(d^2\theta c/dt^2) = Mc*g2*hP - Mc*g*hP(\Delta\theta + \Delta\theta c) - LF*KF(xcFL + XcFR) + LR*KR(xcRL + xcRR) - F21 \quad (6)$$

wherein,
g1: lateral acceleration
g2: longitudinal acceleration
TF: lateral spacing between the center of gravity of the cab and the front springs
TR: lateral spacing between the center of gravity of the cab and the rear springs
LF: longitudinal spacing between the center of gravity of the cab and the front springs
LR: longitudinal spacing between the center of gravity of the cab and the rear springs
KF, KR: spring constants of the front spring and rear springs As shown in FIG. 3, in the Equation (6), the first term in right side is the moment for causing the cab 3 to roll (pitch) due to the lateral acceleration (longitudinal acceleration) that exerts on the center O of gravity of the cab, that is, the product of Mc*g1 and hR (product of Mc*g2 and hP); the second term is the moment for causing the cab 3 to roll (pitch) due to the acceleration g of gravity that exerts on the center O of the cab, that is, the product of Mc*g and hR sin $(\Delta\phi + \Delta\phi c)$ [product of Mc*g and hP sin $(\Delta\theta + \Delta\theta c)$]; and the third and fourth terms are the roll restoring force (pitch restoring force) exerted by the reaction of the springs 18 to the cab 3.

Accordingly, for the purpose of keeping the cab 3 flat (parallel to the road surface) when the vehicle turns and runs in the mode of acceleration and deceleration, the inertia control amount to be applied to the cab 3 by the hydraulic actuators 19, that is, the roll control amount F11 and the pitch control amount F21 are expressed by the following equation (7):

$$F11 = Mc*g1*hR - Mc*g*hR(\Delta\phi + \Delta\phi c) - TF*KF(xcFL - XcFR) - TR*KR(xcRL - xcRR)$$

$$F21 = Mc*g2*hP - Mc*g*hP(\Delta\theta + \Delta\theta c) - LF*KF(xcFL + XcFR) + LR*KR(xcRL + xcRR) \quad (7)$$

Next, the attitude control of the cab with respect to the longitudinal input will be described. Let zL and zR be the longitudinal position of the cab 3 with respect to the vehicle frame 25 and let zlO and zRO be the standard position as intended. Then, the longitudinal position changes zcL and zcR of left and right parts of the cab 3 with respect to the vehicle frame 25, the longitudinal displacement amount $\Delta zc$ and the yaw displacement amount $\Delta\psi c$ of the center O of gravity of the cab are expressed by the following equation (8):

$$zcL = zL - zLO$$

$$zcR = zR - zRO$$

$$\Delta zc = (zcL - zcR)/2$$

$$\Delta\psi c = (zcL - zcR)/K\phi \quad (8)$$

wherein,
$K\phi$: constant

By using the above Equation (8), the vibration control amount of the cab 3 with respect to the longitudinal input, that is, the longitudinal displacement control amount F42 and the yaw control amount F52 are expressed by the following equation (9):

$$F42 = K13\ \Delta zc + K14\ d\Delta zc/dt + K15\int\Delta zc\ dt$$

$$F52 = K16\ \Delta\psi c + K17\ d\Delta\psi c/dt + K18\int\Delta\psi c\ dt \quad (9)$$

wherein,
K13 to K18: constant

Since the moment Lcg*F42 in connection with the center O of gravity of the cab based on the longitudinal displacement control amount F42 is added to the pitch control amount F22 in the Equation (5a), the following equation (10) results:

$$F22 = K3[\Delta\theta] + K4\ d[\Delta\theta]/dt + K8\int[\Delta\theta]\ dt - Lcg*F42 \quad (10)$$

wherein,
Lcg: vertical spacing between the center O of gravity of the cab and the hydraulic actuators 49

As shown in FIG. 4, according to the present invention, the following are detected on the basis of the aforementioned principle. The vehicle heights hFL to hRR of the vehicle frame 25 and the vehicle heights hcFL to hcRR of the cab 3 are detected by the vehicle height sensor 31 and the vehicle height sensor 28, respectively. The lateral and longitudinal accelerations g1 and g2 of the center O of gravity of the cab are detected by the acceleration sensors 32 and 33 disposed on the cab 3. The longitudinal positions zL and zR of the cab 3 are detected by the longitudinal position sensor 52, and the oil pressures pFL to pRR and pzFAL to pzFAR of the hydraulic actuators 19 and 49 are detected by the hydraulic sensors 17 and 47.

The relative displacement amounts $\Delta\phi$, $\Delta\theta$, $\Delta x$ in modes of roll, pitch and bounce of the vehicle frame 25 with respect to the axle, and the relative displacement amounts $\Delta\phi c$, $\Delta\theta c$, $\Delta xc$ in modes of roll, pitch and bounce of the cab 3 with respect to the vehicle frame 25 are obtained by the cab vertical vibration amount calculation means 36, and the longitudinal displacement amount $\Delta zc$ and the yaw displacement amount $\Delta\psi c$ of the center O of gravity of the cab with respect to the vehicle frame 25 are obtained by the cab longitudinal vibration calculation means 56.

The vibration control amounts F11, F21, F12, F22 and F32 in modes of roll, pitch and bounce of the cab 3 are obtained from the relative displacement amounts $\Delta\phi$, $\Delta\theta$, $\Delta x$ in modes of roll, pitch and bounce of the vehicle frame 25 with respect to the axle, the relative displacement amounts $\Delta\phi c$, $\Delta\theta c$, $\Delta xc$ in modes of roll, pitch and bounce of the cab 3 with respect to the vehicle frame 25, and the lateral acceleration g1 and longitudinal acceleration g2 detected by the acceleration sensors 32 and 33, by the cab control amount calculation means 38. The longitudinal displacement control amount F42 and the yaw displacement control amount F52 of the cab 3 are obtained from the longitudinal displacement amount $\Delta zc$ and the yaw displacement amount $\Delta\psi c$ of the cab 3.

Next, control voltages VcFL to VcRR, and VcFAL and VcFAR of oil amount control valves 16 and 46 represented by the following equation (11), which correspond to control amounts F11, F21, F12, F22, F32, F42 and F52, are obtained by the oil amount control means 39.

$$VcFL = -KV1\ F12 - KV2\ F22 + KV5\ F32 - KV7\ F11 - KV9\ F21$$

$$VcFR = +KV1\ F12 - KV2\ F22 + KV5\ F32 + KV7\ F11 - KV9\ F21$$

$$VcRL = -KV3\ F12 + KV4\ F22 + KV6\ F32 - KV8\ F11 + KV0\ F21$$

$$VcRR = +KV3\ F12 + KV4\ F22 + KV6\ F32 + KV8\ F11 + KV0\ F21$$

$$VcFAL = KV11\ F42 - KV12\ F52$$

$$VcFAR = KV13\ F42 + KV14\ F52 \quad (11)$$

wherein,

KV0 to KV9, KV11 to KV14: constant

Finally, if the oil amount control valves 16 and 46 are driven on the basis of the control voltages VcFL to VcRR, VcFAL, VcFAR and feedback signal voltages of the hydraulic sensors 17 and 47 to control the hydraulic actuators 19 and 49, it is possible to suppress the vertical and longitudinal vibrations of the cab 3 to maintain the attitude thereof substantially flat (parallel to the road surface).

FIGS. 5 to 8 are respectively flow charts of a control program for performing the aforementioned control by an electronic control device comprised of a microcomputer. The present control program is repeatedly executed every predetermined time. p11 to p24, p41 to p46, and p51 to p57 represent the steps for the control program. In P11, the control program starts. In step p12, initialization is carried out. In p13, the step shifts to the oil pressure hold routine shown in FIG. 7, in which the switching valve 12 of the oil pressure hold means A is driven to maintain the output oil pressure pm at a predetermined value pc.

In p14, the vehicle heights hFL to hRR of the vehicle frame 25, the vehicle heights hcFL to hcRR of the cab 3, the longitudinal positions zL, Zr of the cab 3, and the oil pressures pFL to pRR, pzFAL and pzFAR of the hydraulic actuators 19 and 49 are read from the vehicle height sensor 31, the vehicle height sensor 28, the longitudinal position sensor 52 and the hydraulic sensors 17 and 47, respectively. In p15, the lateral acceleration g1 and the longitudinal acceleration g2 acting on the center of gravity of the cab are read from the acceleration sensors 32 and 33. In p16, the vehicle height change amounts xFL to xRR of the vehicle frame 25, the vehicle height change amounts xcFL to xcRR of the cab, and the longitudinal displacement amounts zcL and zcR of left and right parts of the cab 3 are obtained from the vehicle heights hFL to hRR of the vehicle frame 25, the vehicle heights hcFL to hcRR of the cab 3 and the longitudinal positions zL and zR of the cab 3, respectively.

In p17, the roll displacement amount $\Delta\phi$, the pitch displacement amount $\Delta\theta$ and the bounce displacement amount $\Delta x$ of the vehicle frame 25 are obtained from the vehicle height change amounts xFL to xRR of the vehicle frame, and the roll displacement amount $\Delta\phi c$, the pitch displacement amount $\Delta\theta c$ and the bounce displacement amount $\Delta xc$ of the cab 3 are obtained from the vehicle height change amounts xcFL to xcRR of the cab 3.

In p18, the longitudinal displacement amount $\Delta zc$ and the yaw displacement amount $\Delta\psi c$ are obtained from the longitudinal displacement amounts zcL, zcR of left and right parts of the cab 3. In p19, the longitudinal displacement control amount F42 and the yaw displacement control amount F52 of the cab 3 are obtained from the longitudinal displacement amount $\Delta zc$ and the yaw displacement amount $\Delta\psi c$ of the center of gravity of the cab.

In p20, the roll control amount F11 of the cab 3 when it turns and the pitch control amount F21 of the cab when it runs in modes of acceleration and deceleration are obtained from the lateral acceleration g1 and the longitudinal acceleration g2 of the center of gravity of the cab, the roll displacement amount $\Delta\phi$, the pitch displacement amount $\Delta\theta$ of the vehicle frame 25, the roll displacement amount $\Delta\phi c$, the pitch displacement amount $\Delta\theta c$ of the cab 3 and the vehicle height change amounts xcFL to xcRR at points of the cab 3.

In p21, the roll control amount F12, the pitch control amount F22 and the bounce control amount F32 of the cab 3 are obtained from the pitch displacement amount $\Delta\phi + \Delta\phi c$, the roll displacement amount $\Delta\theta + \Delta\theta c$ and the bounce displacement amount $\Delta x + \Delta xc$ of the cab 3 with respect to the axle, the differential values $d(\Delta\phi + \Delta\phi c)/dt$, $d(\Delta\theta + \Delta\theta c)/dt$ and $d(\Delta x + \Delta xc)/dt$ thereof, and integrating values $\int(\Delta\phi + \Delta\phi c)dt$, $\int(\Delta c + \Delta\theta c)dt$ and $\int(\Delta x + \Delta xc)dt$. In p22, the control voltages VcFL to VcRR, VcFAL and VcFAR of the oil amount control valves 16 and 46 corresponding to the vibration control amounts F11, F21, F12, F22 and F32 of the cab 3 are obtained. In p23, the step shifts to the hydraulic actuator driving routine, in which oil amounts of the hydraulic actuators 19 and 49 are adjusted by the oil amount control valves 16 and 46. The procedure terminates in step 24.

Figure 7:
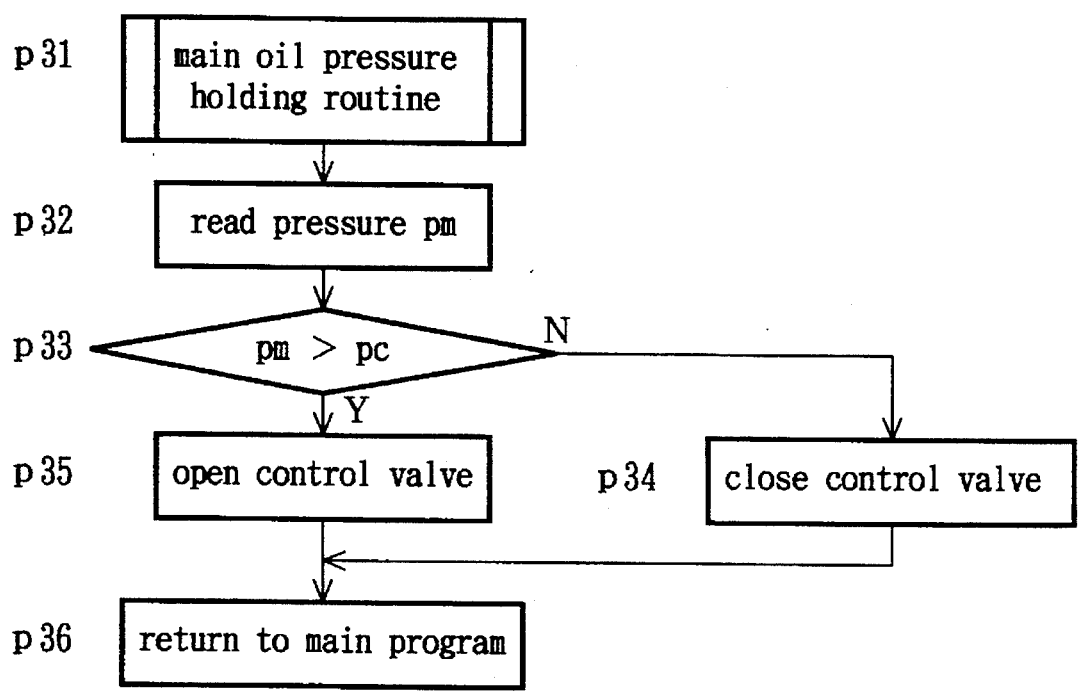
FIG. 7 is a flow chart of the control program.

As shown in FIG. 7, the oil pressure hold routine starts in p41. In p42, the output oil pressure pm of the hydraulic pump 4 is read by the oil pressure hold means A. In p43, determination is made whether the output oil pressure pm is higher than a predetermined value pc or not, when the output oil pressure pm is lower than the predetermined value pc, the switching valve 12 is closed in p44 to increase the output oil pressure pm, and when the output oil pressure pm is higher than the predetermined value pc, the switching valve 12 is opened in p45 to decrease the output oil pressure pm to keep the predetermined value pc. In p46, the step returns to the present program. As shown in FIG. 8, in p51, the hydraulic actuator driving routine starts. In p52, oil pressures pFL to pRR, pzFAL and pzFAR of the hydraulic actuators 19 and 49 are read from the hydraulic sensors 17 and 47. In p53, the oil pressures pFL to pRR, pzFAL and pzFAR are converted into the voltages VsFL to VsRR, VsFAL and VsFAR. In p54, exciting voltages VeFL to VeRR, VeFAL and VeFAR of the oil amount control valves 16 and 46 are obtained from the aforementioned control voltages VcFL to VcRR, VcFAL and VcFAR and voltages VsFL to VsRR, VsFAL and VsFAR. In p55, the oil amount control valves 16 and 46 are excited to regulate oil amounts QFL to QRR, QFAL and QFAR which are supplied to or discharged from the hydraulic actuators 19 and 49. In p56, the hydraulic actuators 19 and 49 are driven, and in p57, the step returns to the present program.

As shown in FIG. 9, the oil amounts QFL to QRR, WFAL and QFAR to the hydraulic actuators 19 and 49 are regulated by the exciting voltages VeFL to VeRR, VeFAL and VeFAR of the oil amount control valves 16 and 46.

From the above-described configuration, it is possible to reduce not only the vibrations in modes of roll, pitch, and bounce of the cab 3 but also the longitudinal vibrations to improve the pleasantness and comfortableness to ride of occupants.

The partially modified embodiments shown in FIGS. 10 and 11 are merely different from the aforementioned embodiments in that vibration control amounts of the cab 3, that is, the longitudinal displacement control amounts F42L and F42R with respect to the longitudinal input are obtained from the longitudinal displacement amounts $\Delta zcL$ and $\Delta zcR$ on the left side and on the right side of the cab 3 with respect to the vehicle frame 25. Let zL and zR be the longitudinal position of the cab 3 with respect to the vehicle frame 25 and let zLO and zRO be the standard position as intended, the longitudinal displacement amounts $\Delta zcL$ and $\Delta zcR$ on the left side and on the right side of the cab 3 with respect to the vehicle frame 25 are represented by the following equation (12):

$$\Delta zcL = zL - zLO$$

$$\Delta zcR = zR - zRO \quad (12)$$

By using the above Equation (12), the longitudinal displacement control amounts F42L and F42R with respect to the longitudinal input are represented by the following equation (13) in consideration of the transient characteristics of the longitudinal vibrations.

$$F42L = K13\, \Delta zcL + K14\, d\Delta zcL/dt + K15 \int \Delta zcL\, dt$$

$$F42R = K16\, \Delta zcR + K17\, d\Delta zcR/dt + K18 \int \Delta zcR\, dt \quad (13)$$

wherein
K13 to K18: constant

Accordingly, the control voltages VcFL to VcRR, VcFAL and VcFAR of the oil amount control valves 16 and 46 corresponding to the control amounts F11, F21, F12, F22, F32, F42L and F42R are represented by the following equation (14):

$$VcFL = -KV1\, F12 - KV2\, F22 + KV5\, F32 - KV7\, F11 - KV9\, F21$$

$$VcFR = +KV1\, F12 - KV2\, F22 + KV5\, F32 + KV7\, F11 - KV9\, F21$$

$$VcRL = -KV3\, F12 + KV4\, F22 + KV6\, F32 - KV8\, F11 + KV0\, F21$$

$$VcRR = +KV3\, F12 + KV4\, F22 + KV6\, F32 + KV8\, F11 + KV0\, F21$$

$$VcFAL = KV11\, F42$$

$$VcFAR = KV13\, F42 \quad (14)$$

wherein
KV0 to KV9, KV11 and KV12: constant

FIGS. 10 and 11 are flow charts for performing the aforementioned control by an electronic control device comprised of a microcomputer. The present control program is repeatedly executed every predetermined time. p61 to p73 represent the steps of the control program. In p61, the control program starts. In p62, the initialization is carried out. In p63, the step shifts to the oil pressure hold routine shown in FIG. 7, in which the switching valve 12 of the oil pressure hold means A is driven to keep the output oil pressure at a predetermined value pc.

In p64, the vehicle heights hFL to hRR of the vehicle frame 25, the vehicle heights hcFL to hcRR of the cab 3, the longitudinal positions zL, Zr of the cab 3, and the oil pressures pFL to pRR, pzFAL and pzFAR of the hydraulic actuators 19 and 49 are read from the vehicle height sensors 31, the vehicle height sensors 28, the longitudinal position sensors 52, and the hydraulic sensors 17 and 47, respectively. In p65, the lateral acceleration g1 and the longitudinal acceleration g2 acting on the center of gravity of the cab are read from the acceleration sensors 32 and 33. In p66, the vehicle height change amounts xFL to xRR of the vehicle frame 25, the vehicle height change amounts xcFL to xcRR of the cab, and the longitudinal displacement amounts $\Delta zcL$ and $\Delta zcR$ of left and right parts of the cab 3 are obtained from the vehicle heights hFL to hRR of the vehicle frame 25, the vehicle heights hcFL to hcRR of the cab 3, and the longitudinal positions zL and zR of the cab 3, respectively.

In p67, the relative displacement amount, that is, the roll displacement amount $\Delta\phi$, the pitch displacement amount $\Delta\theta$ and the bounce displacement amount $\Delta x$ of the vehicle frame 25 are obtained from the vehicle height change amounts xFL to xRR of the vehicle frame, and the relative displacement amount, that is, the roll displacement amount $\Delta\phi c$, the pitch displacement amount $\Delta\theta c$ and the bounce displacement amount $\Delta xc$ of the cab 3 are obtained from the vehicle height change amounts xcFL to xcRR of the cab 3.

In p68, the longitudinal displacement control amounts F42L and F42R are obtained from the longitudinal displacement amounts $\Delta zcL$, $\Delta zcR$ of left and right parts of the cab 3. In p69, the roll control amount F11 of the cab 3 when it turns and the pitch control amount F21 of the cab when it runs in modes of acceleration and deceleration are obtained from the lateral acceleration g1 and the longitudinal acceleration g2 of the center of gravity of the cab, the roll displacement amount $\Delta\phi$, the pitch displacement amount $\Delta\theta$ of the vehicle frame 25, the roll displacement amount $\Delta\phi c$, the pitch displacement amount $\Delta\theta c$ of the cab 3 and the vehicle height change amounts xcFL to xcRR at points of the cab 3.

In p70, the roll control amount F12, the pitch control amount F22 and the bounce control amount F32 of the cab 3 are obtained from the pitch displacement amount $\Delta\phi + \Delta\phi c$, the pitch displacement amount $\Delta\theta + \Delta\theta c$ and the bounce displacement amount $\Delta x + \Delta xc$ of the cab 3 with respect to the axle, the differential values $d(\Delta\phi+\Delta\phi c)/dt$, $d(\Delta\theta+\Delta\theta c)/dt$ and $d(\Delta x+\Delta xc)/dt$ thereof, and integrating values $\int(\Delta\phi+\Delta\phi c)dt$, $\int(\Delta c+\Delta\theta c)dt$ and $\int(\Delta x+\Delta xc)dt$.

In p71, the control voltages VcFL to VcRR, VcFAL and VcFAR of the oil amount control valves 16 and 46 corresponding to the vibration control amounts F11, F21, F12, F22 and F32 of the cab 3 are obtained. In p72, the step shifts to the hydraulic actuator driving routine, shown in FIG. 8, in which oil amounts of the hydraulic actuators 19 and 49 are adjusted by the oil amount control valves 16 and 46. The procedure terminates in step 73.

Obviously,, many modifications and variations of the present invention are possible in light of the above teachings. It is to be understood, therefore, that the invention can be practiced otherwise than as specifically described.

What is claimed is:

1. A road vehicle cab attitude controlling apparatus comprising:
    frame means supported by wheels of the vehicle;
    a cab mounted on said frame means;
    suspension means mounting said cab on said frame means and allowing relative movement therebetween;
    cab actuator means for controlling longitudinally directed motion of said cab with respect to said frame;
    sensing means for detecting longitudinal displacements between said frame means and said cab; and
    control means for controlling said actuator means in response to said sensing means, and operable to suppress said longitudinal displacements between said frame means and said cab; said control means producing for said actuator means longitudinal displacement control signals represented by the sum of a value dependent on a difference between said longitudinal displacements, a differential of said value and an integral of said value.

2. An apparatus according to claim 1 wherein said actuator means comprises a first actuator for producing with respect to said frame means horizontal displacements of a first portion of said cab, and a second actuator for producing with respect to said frame means horizontal displacements of a second portion of said cab, said first and second portions of said cab being located on opposite sides of a center of gravity of said cab.

3. An apparatus according to claim 2 wherein first and second portions are spaced apart transversely on opposite sides of said center of gravity.

4. An apparatus according to claim 3 wherein said first and second portions are horizontally aligned and vertically spaced a given distance from said center of gravity of said cab.

5. An apparatus according to claim 2 wherein said sensing means comprises sensors for detecting, respectively, horizontal displacements of said first and second portions.

6. An apparatus according to claim 5 wherein said first and second portions are spaced apart transversely on opposite sides of said center of gravity, and said horizontal displacements are longitudinal displacements.

7. An apparatus according to claim 6 wherein said first and second actuators comprise a pair of hydraulic actuators, each including a piston and cylinder.

8. An apparatus according to claim 6 wherein said control means produces for said actuator means control signals for suppressing longitudinal, and yaw movements of said center of gravity of said cab with respect to said frame means.

9. An apparatus according to claim 2 wherein said first and second actuators comprise a pair of hydraulic actuators, each including a piston and cylinder.

10. An apparatus according to claim 9 wherein said sensor means comprise sensors for detecting relative movement of said pistons with respect to said cylinders.

11. An apparatus according to claim 10 wherein first and second portions are spaced apart transversely on opposite sides of said center of gravity.

12. An apparatus according to claim 10 wherein said sensing means comprises sensors for detecting, respectively, horizontal displacements of said first and second portions.

13. An apparatus according to claim 12 wherein said first and second portions are spaced apart transversely on opposite sides of said center of gravity, and said horizontal displacements are longitudinal displacements.

14. An apparatus according to claim 13 wherein said first and second actuators comprise a pair of hydraulic actuators, each including a piston and cylinder.

15. An apparatus according to claim 10 wherein said first and second portions are horizontally aligned and vertically spaced a given distance from said center of gravity of said cab.

16. An apparatus according to claim 1 wherein said value is F42 represented by the following Equation:

$$F42 = (K13)(\Delta zc) + (K14)(d\Delta zc/dt) + (K15)(\int \Delta zc\, dt)$$

wherein $\Delta zc$ is equal to ½ the detected difference between said longitudinal displacements of said center of gravity of the cab with respect to said frame means, and K13 to K15 are constants.

17. An apparatus according to claim 16 wherein said first and second portions are horizontally aligned and vertically spaced a given distance from said center of gravity of said cab.

18. An apparatus according to claim 17 wherein said signals include a pitch control signal dependent on the product of said value F42 and said given distance.

19. An apparatus according to claim 17 wherein said control means produces for said actuator means control signals for suppressing longitudinal, yaw and pitch movements of said center of gravity of said cab with respect to said frame means.

20. A road vehicle cab attitude controlling apparatus comprising:
    frame means supported by wheels of the vehicle;
    a cab mounted on said frame means;
    suspension means mounting said cab on said frame means and allowing relative movement therebetween;
    cab actuator means for controlling longitudinally directed motion of said cab with respect to said frame;
    sensing means for detecting longitudinal displacements between said frame means and said cab; and
    control means for controlling said actuator means in response to said sensing means, and operable to suppress said longitudinal displacements between said frame means and said cab, said control means producing for said actuator means control signals for suppressing longitudinal, yaw and pitch movements of the center of gravity of said cab with respect to said frame means.

* * * * *